US009441693B2

(12) United States Patent
Unno et al.

(10) Patent No.: US 9,441,693 B2
(45) Date of Patent: Sep. 13, 2016

(54) NON-ASBESTOS FRICTION MATERIAL COMPOSITION, AND FRICTION MATERIAL AND FRICTION MEMBER USING SAME

(75) Inventors: Mitsuo Unno, Ibaraki (JP); Kazuya Baba, Ibaraki (JP); Takashi Kikudome, Ibaraki (JP)

(73) Assignee: HITACHI CHEMICAL COMPANY, LTD., Tokyo (JP)

( * ) Notice: Subject to any disclaimer, the term of this patent is extended or adjusted under 35 U.S.C. 154(b) by 0 days.

(21) Appl. No.: 13/819,738

(22) PCT Filed: Nov. 7, 2011

(86) PCT No.: PCT/JP2011/075644
§ 371 (c)(1),
(2), (4) Date: Apr. 3, 2013

(87) PCT Pub. No.: WO2012/066969
PCT Pub. Date: May 24, 2012

(65) Prior Publication Data
US 2013/0220748 A1 Aug. 29, 2013

(30) Foreign Application Priority Data

Nov. 19, 2010 (JP) ................................. 2010-259501

(51) Int. Cl.
*F16D 69/02* (2006.01)
*F16D 65/092* (2006.01)

(52) U.S. Cl.
CPC ........... *F16D 69/028* (2013.01); *F16D 65/092* (2013.01); *F16D 69/026* (2013.01); *F16D 2200/0086* (2013.01)

(58) Field of Classification Search
CPC ................. F16D 69/00; F16D 69/028; F16D 2200/0086
See application file for complete search history.

(56) References Cited

U.S. PATENT DOCUMENTS

| 4,477,605 | A | | 10/1984 | Okubo et al. | |
|---|---|---|---|---|---|
| 4,785,029 | A | * | 11/1988 | Honma et al. | 523/153 |
| 5,830,566 | A | * | 11/1998 | Kimura et al. | 428/323 |
| 5,866,636 | A | * | 2/1999 | Nitto et al. | 523/155 |
| 6,303,545 | B1 | * | 10/2001 | Huner et al. | 508/105 |
| 6,372,817 | B1 | | 4/2002 | Kinouchi et al. | |
| 7,097,009 | B2 | * | 8/2006 | Shao et al. | 188/251 A |
| 7,740,698 | B2 | * | 6/2010 | Kitami et al. | 106/36 |
| 8,536,244 | B2 | * | 9/2013 | Schoo | F16D 69/025 523/149 |
| 2010/0331447 | A1 | | 12/2010 | Schoo et al. | |

FOREIGN PATENT DOCUMENTS

| CN | 101792654 A | 8/2010 | |
|---|---|---|---|
| DE | 20 2010 003 143 U1 | 8/2010 | |
| JP | 2002-138273 | 5/2002 | |
| JP | 2006-199753 | 8/2006 | |
| JP | 2008-291108 | 12/2008 | |
| JP | 2010-222555 | 10/2010 | |
| WO | WO 03087255 A1 * | 10/2003 | ............. F16D 69/02 |
| WO | WO 2011049575 A1 * | 4/2011 | ........... F16D 69/026 |

OTHER PUBLICATIONS

Machine translation of WO 03/087255 A1, retrieved Mar. 2016.*
Communication mailed Apr. 17, 2014, in connection with European Patent Application No. 11840785.7, 5 pages; European Patent Office, Munich, Germany.
Machine translation of Communication mailed Aug. 1, 2013, in connection with Chinese Application, 2 pages.
Machine translation of CN 1451680 A, 4 pages.
Machine translation of JP 2006-199753; 7 pages.
Machine translation of Communication mailed Mar. 24, 2014, in connection with Chinese Application, 3 pages
European Office Action dated Jul. 10, 2015, for European Application. No. 11 840 785.7.

* cited by examiner

*Primary Examiner* — Nicole M Buie-Hatcher
(74) *Attorney, Agent, or Firm* — Fitch, Even, Tabin & Flannery LLP

(57) ABSTRACT

A non-asbestos frictional material composition containing a binder, an organic filler, an inorganic filler, and a fiber base material includes: copper in a content of 0.5 mass % or less as a copper element; a metal fiber other than a copper fiber and a copper alloy fiber in a content of 0.5 mass % or less; cashew dust in a content of 3.5-10.0, wollastonite, and mica. The non-asbestos frictional material composition can provide a frictional material with excellent friction coefficient, anti-crack properties, and abrasion resistance even with the reduced content of copper and a copper fiber possibly causing environmental pollution. The frictional material and the friction member are formed by using the above-mentioned non-asbestos frictional material composition.

9 Claims, 1 Drawing Sheet

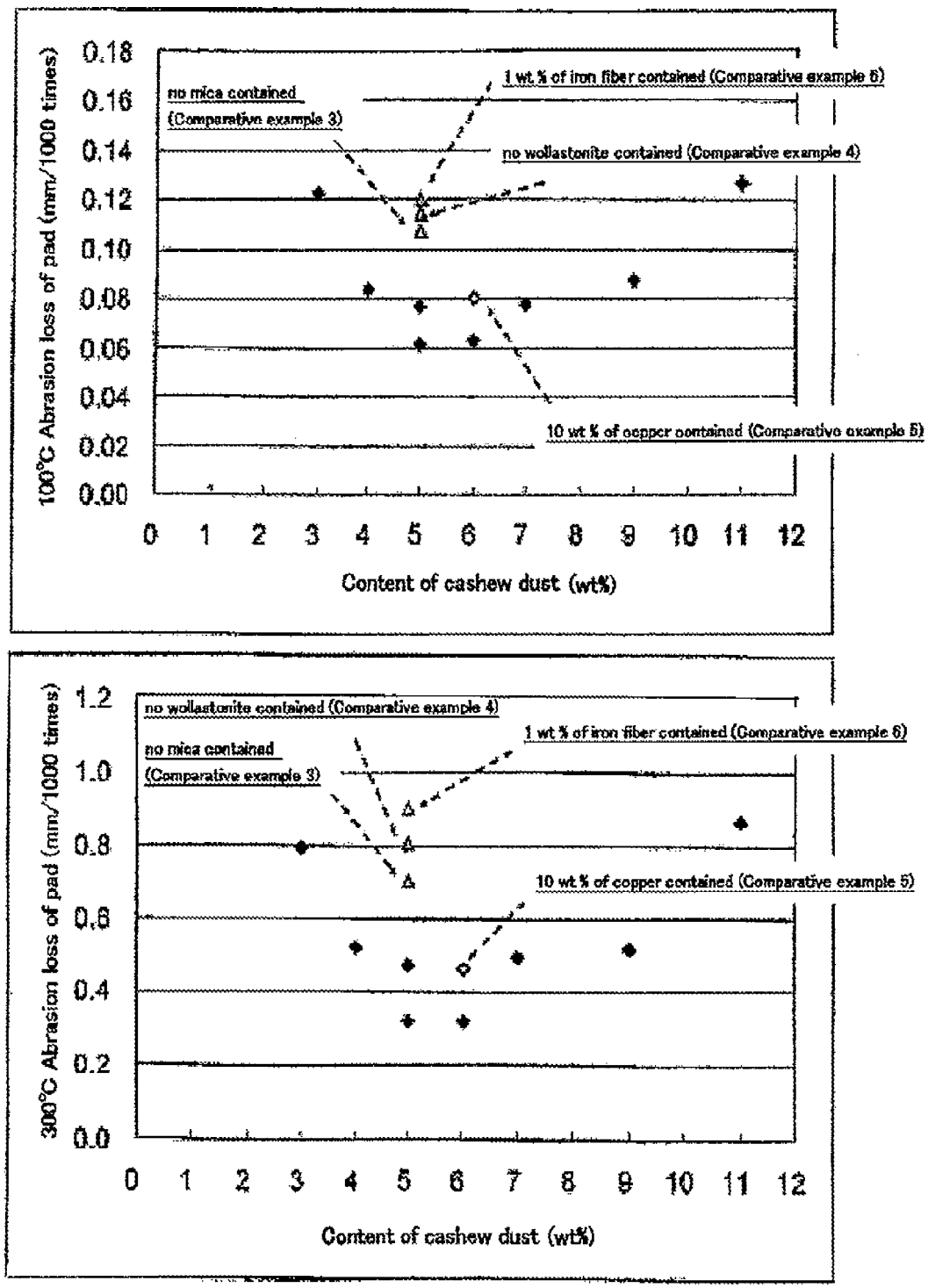

NON-ASBESTOS FRICTION MATERIAL COMPOSITION, AND FRICTION MATERIAL AND FRICTION MEMBER USING SAME

TECHNICAL FIELD

The present invention relates to a non-asbestos frictional material composition, and a frictional material and a friction member formed by using the same. Specifically, the present invention relates to a non-asbestos frictional material composition with low environmental load due to the low content of copper and with excellent friction coefficient, anti-crack properties, and abrasion resistance, which is appropriate for frictional materials such as a disc brake pad and a brake lining to brake a car and the like. The present invention further relates to a frictional material and a friction member formed by using this non-asbestos frictional material composition.

BACKGROUND ART

Frictional materials such as a disc brake pad and a brake lining are used for braking a car and the like. The frictional materials play a role in the brake by frictioning facing members such as a disc rotor and a brake drum. Therefore, for the frictional materials, not only increasing and stabilizing the friction coefficient but also hardly wearing the disc rotor that is a facing member (anti-rotor-abrasion resistance), hardly generating the squeal (squeal properties), and prolonging the life of the pad (abrasion resistance) are required. The durability performance such as no shearing during the braking at a high load (shear strength) or no cracks by the high temperature braking history (anti-crack properties) are also required.

A frictional material includes a binder, a fiber base material, an inorganic filler, and an organic filler, generally in combination with one or two or more kinds thereof to provide the above-mentioned properties. As the fiber base material, an organic fiber, a metal fiber, an inorganic fiber, and the like are used. To improve the anti-crack properties and the abrasion resistance, a copper fiber and a copper alloy fiber are generally used as the metal fiber. To further improve the abrasion resistance, chips and powders of copper and copper alloy may be used. As the frictional material, a non-asbestos frictional material is a mainly used, which is formed by using a large amount of copper, copper alloy, and the like.

However, the frictional material containing copper and copper alloy generates abrasion powder containing copper during the braking. Since it is suggested that the abrasion powder leads to pollution of rivers, lakes, and oceans, there is a movement accelerated to control the use of the non-asbestos frictional material.

To provide a frictional material containing no copper or copper alloy with excellent friction coefficient, abrasion resistance, and rotor abrasion resistance, it is proposed that the frictional material for the brake with a fiber base material, a binder, and a friction adjustment component do not contain a heavy metal or a heavy-metal compound and that the frictional material contains magnesium oxide and graphite in a content of 45-80 vol %, in which the ratio of magnesium oxide to graphite is 1/1-4/1 (see to Patent Literature 1).

CITATION LIST

Patent Literature

PTL1: JP 2002-138273A

DISCLOSURE OF THE INVENTION

However, the frictional material for the brake of Patent document 1 hardly satisfies all of the friction coefficient, the anti-crack properties, and the abrasion resistance.

On the other hand, as metal fibers other than a copper fiber contained in the frictional material, iron fibers such as a steel fiber and a cast iron fiber are used for the purpose of improving the anti-crack properties. However, iron fibers have a disadvantage of the high aggression to a facing member. Nonferrous metal fibers such as a zinc fiber and an aluminum fiber generally used for a frictional material as metal fibers other than a copper fiber often have a low heatproof temperature compared with a copper fiber and an iron fiber. This causes a problem of the deteriorated abrasion resistance of the frictional material. An inorganic fiber is used to improve the anti-crack properties of the frictional material. However, to obtain the satisfied anti-crack properties, a large amount of inorganic fiber should be added. This causes a problem of the deteriorated abrasion resistance.

It is known that the use of graphite can improve the abrasion resistance of the frictional material. However, to obtain the satisfied anti-crack properties, a large amount of graphite should be added. This causes a problem of the substantially lowered friction coefficient.

As mentioned above, the frictional material containing the reduced content of copper has poor abrasion resistance and anti-crack properties and hardly satisfies all of the friction coefficient, the anti-crack properties, and the abrasion resistance.

In view of such a background, the objective of the present invention is to provide a non-asbestos frictional material composition capable of providing a frictional material with excellent friction coefficient, anti-crack properties, providing abrasion resistance and a frictional material and a friction member formed by using this non-asbestos frictional material composition, even with the reduced content of copper and copper possibly causing pollution of rivers, lakes, oceans and the like.

As a result of their great effort, the present inventors have found that the above-mentioned problem can be solved by a non-asbestos frictional material composition containing copper and a metal fiber at a certain level or less, a specific amount of cashew dust, wollastonite, and mica so as to achieve the present invention.

The present invention is as follows.

(1) A non-asbestos frictional material composition containing a binder, an organic filler, an inorganic filler, and a fiber base material, comprising: copper in a content of 0.5 mass % or less as a copper element; a metal fiber other than a copper fiber and a copper alloy fiber in a content of 0.5 mass % or less; cashew dust in a content of 3.5-10.0 mass %, wollastonite, and mica.

(2) The non-asbestos frictional material composition according to (1), wherein the content of the wollastonite falls within the range of 1-6 mass %.

(3) The non-asbestos frictional material composition according to (1) or (2), wherein the content of the mica falls within the range of 1-6 mass %.

(4) A frictional material is formed from the non-asbestos frictional material composition according to any one of (1) to (3).

(5) A friction member is formed from the frictional material formed from the non-asbestos frictional material composition according to any one of (1) to (3) and a backing plate.

Advantageous Effects of the Invention

When used for frictional materials such as a disc brake pad and a brake lining for a car, the non-asbestos frictional material composition of the present invention has low environmental load due to the low content of copper in abrasion powder generated during the braking and can provide excellent friction coefficient, anti-crack properties, and abrasion resistance. The use of the non-asbestos frictional material composition of the present invention can provide a frictional material and a friction member with the above-mentioned properties.

BRIEF DESCRIPTION OF THE DRAWINGS

FIG. 1 shows a graph illustrating the abrasion loss corresponding to 1000 times of braking at 100° C. or 300° C. to the content (mass %) of the cashew dust in evaluation of the abrasion resistance for Examples and Comparative examples.

PREFERRED MODE FOR CARRYING OUT THE INVENTION

The non-asbestos frictional material composition of the present invention, and a frictional material and a friction member formed by using the same will be described in detail below.

[Non-Asbestos Frictional Material Composition]

The non-asbestos frictional material composition of the present invention containing a binder, an organic filler, an inorganic filler, and a fiber base material includes: copper in a content of 0.5 mass % or less as a copper element; a metal fiber other than a copper fiber and a copper alloy fiber in a content of 0.5 mass % or less; cashew dust in a content of 3.5-10.0 mass %, wollastonite, and mica.

According to this structure, the non-asbestos frictional material composition of the present invention has low environmental pollution due to the low content of copper in abrasion powder generated during the braking and can provide excellent friction coefficient, anti-crack properties, and abrasion resistance compared with conventional ones.
(Binder)

The binder binds an organic filler, an inorganic filler, a fiber base material, and the like in the frictional material composition to provide strength. As the binder contained the non-asbestos frictional material composition of the present invention, any binders can be used without any limitation in particular as long as being thermosetting resins typically used as a binder of the frictional material.

The above-mentioned thermosetting resins include, for example, a phenol resin; various elastomer-dispersed phenol resins such as an acrylic elastomer-dispersed phenol resin and a silicone elastomer-dispersed phenol resin; and various modified phenol resins such as an acrylic-modified phenol, a silicone-modified phenol resin, a cashew-modified phenol resin, an epoxy-modified phenol resin, and an alkylbenzene-modified phenol resin. These can be used alone or in combination with two or more kinds thereof. In particular, a phenol resin, an acrylic-modified phenol resin, a silicone-modified phenol resin, and an alkylbenzene-modified phenol resin are preferable for providing excellent heat resistance, moldability, and friction coefficient.

The content of the binder in the non-asbestos frictional material composition of the present invention is preferably 5-20 mass %, more preferably 5-10 mass %. The content of the binder adjusted to 5-20 mass % can further prevent the reduced strength of the frictional material and the deterioration of the sound vibration performance such as squeal due to the reduced of the frictional material and the increased elastic modulus.
(Organic Filler)

The organic filler is contained as a friction modifier to improve the sound vibration performance, the abrasion resistance, and the like of the frictional material.

The non-asbestos frictional material composition of the present invention contains cashew dust as the organic filler.

As the above-mentioned cashew dust, any cashew dust, which is obtained by grinding cured cashew nut shell oil, may be used as long as typically used for a frictional material. The particle size of the cashew dust is preferably 850 μm or less, more preferably 750 μm or less, further more preferably 500 μm or less, from the viewpoint of the dispersibility.

The content of the cashew dust in the non-asbestos frictional material composition of the present invention is 3.5-10.0 mass %, preferably 4-8 mass %, more preferably 5-8 mass %. As shown in the graph (FIG. 1) illustrating the abrasion loss corresponding to 1000 times of braking at 100° C. or 300° C. to the content (mass %) of the cashew dust in evaluation of the abrasion resistance for the below-mentioned Examples and Comparative examples, abrasion grows at 100° C. and 300° C. when the content of the cashew dust is less than 3.5 mass % or more than 10.0 mass %.

The non-asbestos frictional material composition of the present invention can further contain an organic filler other than the above-mentioned cashew dust. Such an organic filler is not limited in particular and can be typically used for a rubber component and the like as typically used as an organic filler.

The above-mentioned rubber component includes, for example, natural rubber, acrylic rubber, isoprene rubber, polybutadiene rubber (BR), nitrile-butadiene rubber (NBR), and styrene-polybutadiene rubber (SBR). These can be used alone or in combination with two or more kinds thereof. The cashew dust coated with the rubber component may be used. As the organic filler, the cashew dust and the rubber component is preferably used together from the viewpoint of the sound vibration performance.

The content of the organic filler other than the cashew dust in the non-asbestos frictional material composition of the present invention is preferably 1-20 mass %, more preferably 1-15 mass %, further more preferably 1-10 mass %. The content of the organic filler adjusted to 1-20 mass % can prevent the increased elastic modulus of the frictional material, the deteriorated sound vibration performance such as squeal, the deteriorated heat resistance, and the reduced strength due to the heat history. When the cashew dust and the rubber component are used together, the mass ratio of the cashew dust to the rubber component preferably falls within the range of 2:1-10:1, more preferably 3:1-9:1, further more preferably 4:1-9:1.
(Inorganic Filler)

The inorganic filler is contained as a friction modifier to prevent the heat resistance of the frictional material from deteriorating.

The non-asbestos frictional material composition of the present invention contains mica as the inorganic filler. Containing mica can provide flexibility to the frictional material. The mica is not limited in particular but has a particle size of preferably 600 μm or less, more preferably 400 μm or less, further more preferably 300 μm or less, from the viewpoint of the abrasion resistance.

The content of mica in the non-asbestos frictional material composition of the present invention is preferably 1-6 mass %, more preferably 1-4 mass %, further more preferably 11.5-4 mass %. The content of the mica adjusted to 1 mass % or more can provide excellent friction coefficient, anti-crack properties, and abrasion resistance. The content adjusted to 6 mass % or less can prevent the abrasion resistance from deteriorating.

The non-asbestos frictional material composition of the present invention can contain an inorganic filler other than the above-mentioned mica. As such an inorganic filler, any inorganic fillers are used without limitation as long as typically used for a frictional material.

As the inorganic filler, for example, antimony trisulfide, tin sulfide, molybdenum disulfide, iron sulfide, bismuth sulfide, zinc sulfide, calcium hydroxide, calcium oxide, sodium carbonate, calcium carbonate, magnesium carbonate, barium sulfate, dolomite, coke, graphite, mica, iron oxide, vermiculite, calcium sulphate, granular potassium titanate, plate-like potassium titanate, talc, clay, zeolite, zirconium silicate, zirconium oxide, mullite, chromite, titanium oxide, magnesium oxide, silica, and an activated alumina such γ alumina can be used. These can be used alone in combination with two or more kinds thereof.

The content of the inorganic filler other than the mica in the non-asbestos frictional material composition of the present invention is preferably 30-80 mass %, more preferably 40-80 mass %, further more preferably 60-80 mass %. The content of the inorganic filler adjusted to 30-80 mass % can prevent the heat resistance from deteriorating, which is preferable in point of the content balance against other components of the frictional material.

(Fiber Base Material)

The fiber base material exhibits a reinforcement effect on the frictional material.

The non-asbestos frictional material composition of the present invention contains wollastonite that is an inorganic fiber as the fiber base material. The wollastonite is often used as the fiber base material alternative to asbestos. In the present invention, the mean fiber diameter of the wollastonite is preferably 1-10 μm from the viewpoint of the anti-crack properties and the abrasion resistance. In the present invention, the mean fiber diameter of the wollastonite is also preferably 10-100 μm from the viewpoint of the anti-crack properties and the abrasion resistance. This wollastonite is preferably uniformly dispersed in the non-asbestos frictional material composition of the present invention.

The content of the wollastonite in the non-asbestos frictional material composition of the present invention is preferably 1-6 mass %, more preferably 1.5-6 mass %, further more preferably 2-4 mass %. The content of the wollastonite adjusted to 1 mass % or more can provide excellent friction coefficient, anti-crack properties, and abrasion resistance. The content adjusted to 6 mass % or less can prevent the abrasion resistance from deteriorating.

In the non-asbestos frictional material composition of the present invention, an inorganic filler other than the above-mentioned wollastonite, a metal fiber, an organic fiber, and a carbon fiber can be used as typically used as a fiber base material. These can be used alone or in combination with two or more kinds thereof.

The inorganic fiber other than the wollastonite includes a ceramic fiber, a biodegradable ceramic fiber, a mineral fiber, a glass fiber, a potassium titanate fiber, a silicate fiber, and wollastonite. These can be used alone or in combination with two or more kinds thereof.

Among these inorganic fibers, a potassium titanate fiber and a ceramic fiber, which are inhaled into a lung and the like, are preferably not contained from the viewpoint of decreasing the environmental load material.

The mineral fiber is referred herein to as an artificial inorganic fiber in which blast furnace slag for slag wool, basalt for basalt fiber, and other natural stone are melt-spun as the main component. The mineral fiber is preferably a natural mineral containing an Al element. Specifically, the mineral fiber containing $SiO_2$, $Al_2O_3$, CaO, MgO, FeO, $Na_2O$, and the like alone or in combination with two or more kinds thereof can be used. Preferably, the mineral fiber containing an Al element can be used. As the mean fiber length of the total mineral fiber contained in the frictional material composition increases, the bond strength with each of the components of the frictional material composition tends to be decreased. Therefore, the mean fiber length of the entire mineral fiber is preferably 500 μm or less, more preferably 100-400 μm. The mean fiber length is referred herein to as the number average fiber length indicating the average length of the total corresponding fibers. For example, the mean fiber length of 200 μm indicates that the average length of 50 mineral fibers which are randomly selected and then measured with a light microscope is 200 μm.

The mineral fiber used in the present invention is preferably biosoluble from the viewpoint of the harmful effect on a human body. The biosoluble mineral fiber is referred herein to as a mineral fiber with the feature to be partially broken down in a short time and eliminated from the body even when entering a human body. Specifically, the biosoluble mineral fiber denotes a fiber satisfying the condition in which the chemical composition shows that the total content of an alkali oxide and an alkaline earth oxide (oxides of sodium, potassium, calcium, magnesium, and barium) is 18 mass % or more, in which the short-term continuous aspiration test shows the half-life of 20 μm or more of fiber is 40 days or less, in which the intraperitoneal test shows no evidence for excessive carcinogenic properties, or in which the long-term continuous aspiration test shows no associated pathogenesis or tumorigenesis (Nota Q of EU directive 97/69/EC (exempted from the carcinogenic classification)). Such a biodegradable mineral fiber includes $SiO_2$—$Al_2O_3$—CaO—MgO—FeO—$Na_2O$ type fibers, and a fiber containing $SiO_2$, $Al_2O_3$, CaO, MgO, FeO, and $Na_2O$ in any combination thereof. The commercially available product includes the Roxul fibers produced by LAPINUS FIBRES B.V. The Roxul contains $SiO_2$, $Al_2O_3$, CaO, MgO, FeO, and $Na_2O$.

The metal fiber is not limited in particular as long as typically used for the frictional material, for example, fibers of metals such as copper, aluminum, iron, zinc, tin, titanium, nickel, magnesium, silicon alone, or the alloy thereof, and a fiber mainly containing metal, such as a cast iron fiber.

As the above-mentioned metal fiber, a metal fiber other than a copper fiber and a copper alloy fiber may be used for the non-asbestos frictional material composition of the present invention from the viewpoint of improving the friction coefficient and the anti-crack properties. However, the content should be 0.5 mass % or less from the viewpoint of preventing the abrasion resistance from deteriorating. On the other hand, since metal fibers other than a copper fiber and a copper alloy fiber improves the friction coefficient but easily deteriorates the abrasion resistance, no metal other fibers than a copper fiber and a copper alloy fiber are preferably contained (0 mass %).

To improve the anti-crack properties and the abrasion resistance, a fiber containing copper and copper alloy may be used. However, from the viewpoint of preventing environmental pollution, the total content of the copper in the non-asbestos frictional material composition of the present invention should fall within the range of 0.5 mass % or less as a copper element. Preferably, no copper is contained (0 mass %).

The above-mentioned organic fiber includes an aramid fiber, a cellulose fiber, an acrylic fiber, and a phenol resin fiber. These can be used alone or in combination with two or more kinds thereof.

The above-mentioned carbon fiber includes a flame-resistant fiber, a pitch-based carbon fiber, PAN (a polyacrylonitrile) carbon fiber, and an active carbon fiber. These can be used alone or in combination with two or more kinds thereof.

The content of the fiber base material, including a copper fiber or a copper alloy fiber in the non-asbestos frictional material composition of the present invention is preferably 5-40 mass %, more preferably 5-20 mass %, further more preferably 5-18 mass %. The content of the fiber base material adjusted to 5-40 mass % provides an appropriate porosity as the frictional material so as to prevent squeal, an appropriate material strength, abrasion resistance, and moldability.

(Other Materials)

In the non-asbestos frictional material composition of the present invention, materials other than the binder, the organic filler, the inorganic filler, the fiber base material, the cashew dust, the wollastonite, and the mica can optionally be blended.

For example, unless the total content of copper in the non-asbestos frictional material composition of the present invention exceeds 0.5 mass % as a copper element, metal powder such as copper powder, brass powder, and bronze powder can be blended. For example, to improve the abrasion resistance, an organic additive including a fluorine polymer such as PTFE (polytetrafluoroethylene) can be blended.

[Frictional Material and Friction Member]

The present invention also provides a frictional material and a friction member formed by using the above-mentioned non-asbestos frictional material composition.

The non-asbestos frictional material composition of the present invention can be molded for the use as frictional materials such as a disc brake pad and a brake lining for a car. The frictional material of the present invention exhibits excellent friction coefficient, anti-crack properties, and abrasion resistance and is therefore suitable for a disc brake pad with a large load during the braking.

Through the use of the above-mentioned frictional material, a friction member, which is formed so that the frictional material is the frictional surface, can be obtained. The friction member of the present invention that can be formed by using the frictional material includes, for example, the following structures.

Structure (1): Only the frictional material is contained.
Structure (2): A backing plate and the frictional material consisting of the non-asbestos frictional material composition of the present invention are contained, in which the frictional material is formed to be the frictional surface on the backing plate.

Structure (3): In the structure (2), a primer layer to modify the surface for improving the adhesive effect of the backing plate and an adhesive layer to bond the backing plate with the frictional material are placed between the backing plate and the frictional material.

The above-mentioned backing plate is typically used for a friction member to improve the mechanical strength of the friction member. As the material of the backing plate, a metal, fiber-reinforced plastic, or the like can be used. The material, for example, includes iron, stainless steel, inorganic fiber-reinforced plastic, and a carbon fiber-reinforced plastic. As the material of the backing plate, a metal, a fiber-reinforced plastic, or the like can be used. The material, for example, includes iron, stainless steel, inorganic fiber-reinforced plastic, and a carbon fiber-reinforced plastic. As the primer layer and the adhesive layer, any materials may be used as long as used for a friction member such as a brake shoe.

The frictional material of the present invention can be fabricated using a generally used method by molding, preferably hot press-molding the non-asbestos frictional material composition of the present invention.

Specifically, the non-asbestos frictional material composition of the present invention is uniformly mixed by using a mixer such as a Loedige mixer, a pressure kneader, and an Eirich intensive mixer. The mixture is preformed in a mold. The obtained preformed material is molded under the condition at a molding temperature of 130-160° C. and a molding pressure of 20-50 MPa for 2-10 minutes. The obtained molded product is heated at 150-250° C. for 2-10 hours. The frictional material can be fabricated by coating, scorching, and polishing as needed.

The non-asbestos frictional material composition is useful as the "over layer" of friction members such as a disc brake pad and a brake lining due to excellent friction coefficient, anti-crack properties, and abrasion resistance. The frictional material can be used for being formed as the "under layer" of friction members due to the high anti-crack properties as the frictional material.

The "over layer" is the frictional material formed so as to be the frictional surface of the friction member. The "under layer" is a layer placed between the frictional material formed to be the frictional surface of the friction member and the backing plate in order to improve the shear strength and the anti-crack properties around the part bonding the frictional material with the backing plate.

EXAMPLES

The present invention will be described in detail in reference to Examples. However, the present invention is not limited to these examples.

The evaluation shown in Examples and Comparative examples were conducted as follows.

(1) Evaluation of Friction Coefficient

The friction coefficient was measured based on Japanese Automotive Standards Organization JASO C406. The average of friction coefficients measured in the second effectiveness test was calculated.

(2) Evaluation of Anti-Crack Properties

The braking was repeated at a brake temperature of 400° C. (initial speed: 50 km/h, closing speed: 0 km/h, deceleration: 0.3 G, brake temperature before braking: 100° C.) based on JASO C427 until the thickness of the each frictional material was reduced to half. The generation of cracks on the side face and the frictional surface of the each frictional material was measured. The generation of cracks was evaluated with the following scores 1-3.

Score 1: No cracks were generated.
Score 2: Cracks were generated to the extent where a 0.1 mm thickness gauge does not enter the frictional surface or the side face of the frictional material.
Score 3: Cracks were generated to the extent where a 0.1 mm thickness gauge enters the frictional surface or the side face of the frictional material.

When cracks were generated to the extent where a 0.1 mm thickness gauge does not enter one of the frictional surface and the side face of the frictional material but enters the other, the generation of cracks was evaluated as Score 3.

(3) Evaluation of Abrasion Resistance

The abrasion resistance was measured based on Japanese Automotive Standards Organization JASO C427. The abrasion loss of the each frictional material, which corresponds to 1000 times of braking at brake temperatures of 100° C. and 300° C., were evaluated.

The friction coefficient, the abrasion resistance, and the anti-crack properties were evaluated at an inertia of 7 kgf·m·s² with a dynamometer based on the above-mentioned JASO C406 and JASO C427. The above-mentioned evaluation was carried out using a ventilated disc rotor (material: FC190, available from KIRIU Corporation) and a general pin sliding collet type caliper.

Examples 1-6 and Comparative Examples 1-6

Production of Disc Brake Pad

The materials were blended according to the blend ratio shown in Table 1 to obtain the frictional material compositions of Examples and Comparative examples. Each of the frictional material compositions was mixed using a Loedige mixer (available from MATSUBO Corporation, brand name: Loedige mixer M20). This mixture was preformed with a molding press (available from OJIKIKAI CO., LTD). The obtained preformed material was hot press-molded together with an iron backing plate (available from Hitachi Automotive Systems, Ltd.) using a molding press (SANKI SEIKO CO., LTD.) under the condition at a molding temperature of 145° C. and a molding pressure of 30 MPa for 5 minutes. The obtained molded article was heated at 200° C. for 4.5 hours, polished with a rotary polisher, and then scorched at 500° C. to obtain the disc brake pads (frictional material thickness: 11 mm, frictional material projected area: 52 cm²) of Examples 1-6 and Comparative examples 1-6.

The evaluation results for the produced disc brake pads are shown in Table 1.

From the results of evaluation of the abrasion resistance, a graph illustrating the abrasion loss corresponding to 1000 times of braking at 100° C. or 300° C. to the content (mass %) of the cashew dust is shown in FIG. 1.

Various materials used in Examples and Comparative examples are as follows.

(Binder)
Phenol resin: available from Hitachi Chemical Co., Ltd. (brand name: HP491UP)

(Organic Filler)
Cashew dust: available from Tohoku Chemical Industries, Ltd (brand name: FF-1056)
SBR powder (Inorganic Filler)
Mica: available from Imerys (Brand name: 325HK, mean particle diameter 25 μm, maximum particle size 100 μm)
Barium sulfate: available from SAKAI CHEMICAL INDUSTRY CO., LTD. (brand name: BA)
Potassium titanate: available from Kubota Corporation (Brand name: TXAX-MA, plate-like potassium titanate)
Graphite: available from TIMCAL (brand name: KS75)
Tin sulfide: available from Chemetall (brand name: Stannolube)
Calcium hydroxide
Zirconium oxide (Fiber Base Material)
Wollastonite (inorganic fiber): available from Minpro Industries (brand name: HYCON S-3, mean fiber diameter: 5 μm, mean fiber length: 50 μm)
Aramid fiber (organic fiber): available from DU PONT-TORAY CO., LTD. (brand name: 1F538)
Iron fiber (metal fiber): available from GMT (brand name: #0)
Copper fiber (metal fiber): available from Sunny Metal (brand name: SCA-1070)
Mineral fiber (inorganic fiber): available from LAPINUS FIBRES B.V (brand name: RB240Roxul 1000, mean fiber length: 300 μm)

TABLE 1

| | | | Examples | | | | | | Comparative examples | | | | | |
|---|---|---|---|---|---|---|---|---|---|---|---|---|---|---|
| | | | 1 | 2 | 3 | 4 | 5 | 6 | 1 | 2 | 3 | 4 | 5 | 6 |
| Frictional material composition (%)* | Binder | Phenol resin | 8 | 8 | 8 | 8 | 8 | 8 | 8 | 8 | 8 | 8 | 8 | 8 |
| | Organic filler | Cashew dust | 6 | 5 | 5 | 7 | 4 | 9 | 3 | 11 | 5 | 5 | 6 | 5 |
| | | SBR powder | 1 | 1 | 1 | 1 | 1 | 1 | 1 | 1 | 1 | 1 | 1 | 1 |
| | Inorganic filler | Mica | 1.5 | 4 | 6 | 6 | 4 | 4 | 4 | 4 | 0 | 4 | 4 | 4 |
| | | Barium sulfate | 35 | 31 | 27 | 25 | 32 | 27 | 33 | 25 | 35 | 35 | 20 | 30 |
| | | Potassium titanate | 16 | 16 | 16 | 16 | 16 | 16 | 16 | 16 | 16 | 16 | 16 | 16 |
| | | Graphite | 3 | 3 | 3 | 3 | 3 | 3 | 3 | 3 | 3 | 3 | 3 | 3 |
| | | Tin sulfide | 2 | 2 | 2 | 2 | 2 | 2 | 2 | 2 | 2 | 2 | 2 | 2 |
| | | Calcium hydroxide | 2 | 2 | 2 | 2 | 2 | 2 | 2 | 2 | 2 | 2 | 2 | 2 |
| | | Zirconium oxide | 16 | 16 | 16 | 16 | 16 | 16 | 16 | 16 | 16 | 16 | 16 | 16 |
| | Fiber base material | Wollastonite | 1.5 | 4 | 6 | 6 | 4 | 4 | 4 | 4 | 0 | 4 | 4 | 4 |
| | | Aramid fiber | 3 | 3 | 3 | 3 | 3 | 3 | 3 | 3 | 3 | 3 | 3 | 3 |
| | | Iron fiber | 0 | 0 | 0 | 0 | 0 | 0 | 0 | 0 | 0 | 0 | 0 | 1 |
| | | Copper fiber | 0 | 0 | 0 | 0 | 0 | 0 | 0 | 0 | 0 | 0 | 10 | 0 |

TABLE 1-continued

Table 1

|  |  | Examples | | | | | | Comparative examples | | | | | |
| --- | --- | --- | --- | --- | --- | --- | --- | --- | --- | --- | --- | --- | --- |
|  |  | 1 | 2 | 3 | 4 | 5 | 6 | 1 | 2 | 3 | 4 | 5 | 6 |
|  | Mineral fiber | 5 | 5 | 5 | 5 | 5 | 5 | 5 | 5 | 5 | 5 | 5 | 5 |
| Content of copper as copper element (mass %) | | 0 | 0 | 0 | 0 | 0 | 0 | 0 | 0 | 0 | 0 | 10 | 0 |
| Content of metal fiber other than copper fiber and copper alloy fiber (Iron fiber) (mass %) | | 0 | 0 | 0 | 0 | 0 | 0 | 0 | 0 | 0 | 0 | 0 | 1 |
| Evaluation | Friction coefficient | 0.41 | 0.41 | 0.40 | 0.40 | 0.39 | 0.39 | 0.36 | 0.38 | 0.36 | 0.36 | 0.41 | 0.42 |
|  | Anti-crack properties | Score 1 | Score 1 | Score 1 | Score 1 | Score 1 | Score 1 | Score 2 | Score 2 | Score 3 | Score 3 | Score 1 | Score 1 |
|  | Abrasion resistance (mm/1000 times) 100° C. | 0.06 | 0.06 | 0.08 | 0.08 | 0.08 | 0.09 | 0.12 | 0.13 | 0.11 | 0.11 | 0.08 | 0.12 |
|  | 300° C. | 0.32 | 0.32 | 0.47 | 0.49 | 0.52 | 0.52 | 0.79 | 0.86 | 0.70 | 0.80 | 0.46 | 0.90 |

(%)* Mass % in frictional material composition

Examples 1-6 exhibit friction coefficient, anti-crack properties, and abrasion resistance on about the same level as those of Comparative example 5 containing a large amount of copper. Furthermore, Examples 1-6 clearly shows excellent friction coefficient, anti-crack properties and abrasion resistance compared with Comparative example 1 containing cashew dust in a content of less than 3.5 mass %, Comparative example 2 containing cashew dust in a content of more than 10 mass %, Comparative example 3 containing no mica but wollastonite, and Comparative example 4 containing no wollastonite but mica. Yet furthermore, Examples 1-6 clearly shows excellent abrasion resistance compared with Comparative example 6 further containing a metal fiber other than a copper fiber and a copper alloy fiber in a content of more than 0.5 mass %.

INDUSTRIAL APPLICABILITY

The non-asbestos frictional material composition of the present invention has low environmental pollution due to the low content of copper in abrasion powder generated during the braking, can provide excellent friction coefficient, anti-crack properties, and abrasion resistance, and is therefore useful for frictional materials and friction members, such as a disc brake pad and a brake lining of a car.

The invention claimed is:

1. A non-asbestos frictional material composition containing a binder, an organic filler, an inorganic filler, and a fiber base material, wherein a content of the fiber base material is 5-20 mass % of the non-asbestos frictional material composition, the fiber base material comprises wollastonite in a content of 1-6 mass % of the non-asbestos frictional material composition; the organic filler comprises cashew dust in a content of 5.0-10.0 mass % of the non-asbestos frictional material composition; the inorganic filler comprises mica in a content of 1-6 mass % of the non-asbestos frictional material composition; the content of the inorganic filler other than the mica falls within the range of 60-80 mass % of the non-asbestos frictional material composition; and the non-asbestos frictional material composition comprises no copper and no metal fiber.

2. A frictional material formed from the non-asbestos frictional material composition according to claim 1.

3. A friction member formed from the frictional material formed from the non-asbestos frictional material composition according to claim 1 and a backing plate.

4. The non-asbestos frictional material composition according to claim 1, wherein the fiber base material further comprises an aramid fiber and a mineral fiber; the inorganic filler further comprises barium sulfate, potassium titanate, graphite, tin sulfide, calcium hydroxide, and zirconium oxide, and a content of the barium sulfate is 27 to 35 mass % of the non-asbestos frictional material composition; the organic filler further comprises styrene-polybutadiene rubber powder in a content of 1-10 mass % of the non-asbestos frictional material composition; and the binder comprises a phenol resin in a content of 5-10 mass % of the non-asbestos frictional material composition.

5. A frictional material formed from the non-asbestos frictional material composition according to claim 4.

6. A friction member formed from the frictional material formed from the non-asbestos frictional material composition according to claim 4 and a backing plate.

7. A non-asbestos frictional material composition containing a binder, an organic filler, an inorganic filler, and a fiber base material, wherein a content of the fiber base material is 5-20 mass % of the non-asbestos frictional material composition, the fiber base material comprises a metal fiber other than a copper fiber and a copper alloy fiber in a content of 0.5 mass % or less of the non-asbestos frictional material composition, and wollastonite in a content of 1-6 mass % of the non-asbestos frictional material composition; the organic filler comprises cashew dust in a content of 5.0-10.0 mass % of the non-asbestos frictional material composition; the inorganic filler comprises mica in a content of 1-6 mass % of the non-asbestos frictional material composition; the non-asbestos frictional material composition comprises copper in a content of 0.5 mass % or less, of the non-asbestos frictional material composition, as a copper element; the content of the inorganic filler other than the mica falls within the range of 60-80 mass % of the non-asbestos frictional material composition; the fiber base material further comprises an aramid fiber and a mineral fiber; the inorganic filler further comprises barium sulfate, potassium titanate, graphite, tin sulfide, calcium hydroxide, and zirconium oxide, and a content of the barium sulfate is 27 to 35 mass % of the non-asbestos frictional material composition; the organic filler further comprises styrene-polybutadiene rubber powder in a content of 1-10 mass % of the non-asbestos frictional material composition; and the binder comprises a phenol resin in a content of 5-10 mass % of the non-asbestos frictional material composition.

8. A frictional material formed from the non-asbestos frictional material composition according to claim 7.

9. A friction member formed from the frictional material formed from the non-asbestos frictional material composition according to claim 7 and a backing plate.

* * * * *